US010393298B2

(12) United States Patent
Petrou et al.

(10) Patent No.: US 10,393,298 B2
(45) Date of Patent: Aug. 27, 2019

(54) ROTARY UNION WITH EXPANDING RING

(71) Applicant: Deublin Company, Waukegan, IL (US)

(72) Inventors: Anton A. Petrou, Hawthorn Woods, IL (US); Christoph Budzus, Hessen (DE); Sargon Guliana, Skokie, IL (US)

(73) Assignee: Deublin Company, Waukegan, IL (US)

(*) Notice: Subject to any disclaimer, the term of this patent is extended or adjusted under 35 U.S.C. 154(b) by 308 days.

(21) Appl. No.: 15/416,710

(22) Filed: Jan. 26, 2017

(65) Prior Publication Data
US 2017/0219145 A1 Aug. 3, 2017

Related U.S. Application Data

(60) Provisional application No. 62/289,659, filed on Feb. 1, 2016.

(51) Int. Cl.
| *F16L 27/087* | (2006.01) |
| *B23Q 1/70* | (2006.01) |
| *B23Q 11/10* | (2006.01) |
| *F16L 27/08* | (2006.01) |
| *B23Q 17/00* | (2006.01) |

(52) U.S. Cl.
CPC .............. *F16L 27/087* (2013.01); *B23Q 1/70* (2013.01); *B23Q 11/103* (2013.01); *B23Q 17/007* (2013.01); *F16L 27/082* (2013.01); *F16L 27/0804* (2013.01); *F16L 27/0828* (2013.01); *Y10T 29/49826* (2015.01)

(58) Field of Classification Search
CPC . F16L 27/087; F16L 27/0828; F16L 27/0804; F16L 27/082; B23Q 17/007; B23Q 1/70; B23Q 11/103; F16J 15/164; F16J 15/3224; F16J 15/52; F16J 15/46; Y10T 29/49826

USPC ................ 285/272, 272.1, 275, 910, 918
See application file for complete search history.

(56) References Cited

U.S. PATENT DOCUMENTS

| 2,549,951 A | 4/1951 | Warren |
| 2,631,048 A | 3/1953 | Palmer |
| 2,794,659 A | 6/1957 | Bily |
| 3,937,494 A | 2/1976 | Hicks |
| 3,958,313 A | 5/1976 | Rossborough |
| 5,029,907 A | 7/1991 | Gundy |

(Continued)

FOREIGN PATENT DOCUMENTS

| CN | 203784521 U | 8/2014 |
| JP | 5773297 B1 | 9/2015 |
| WO | WO 2011/061333 A1 | 5/2011 |

OTHER PUBLICATIONS

International Patent Application No. PCT/US2017/015336, Search Report (dated Apr. 21, 2017).

*Primary Examiner* — Zachary T Dragicevich
(74) *Attorney, Agent, or Firm* — Leydig, Voit & Mayer, Ltd.

(57) ABSTRACT

A rotary union includes a housing, a rotating machine component supported in the housing, a rotating seal member associated with the rotating machine component, a non-rotating seal member slidably and sealably disposed within the housing adjacent the rotating seal member, an expandable seal disposed between the non-rotating seal member and the housing, and an internal clamp disposed within an end portion of the expandable seal such that the end portion of the expandable seal is compressed between the internal clamp and the bore of the housing.

16 Claims, 12 Drawing Sheets

(56) References Cited

U.S. PATENT DOCUMENTS

| | | |
|---|---|---|
| 5,209,601 A | 5/1993 | Odill et al. |
| 6,240,965 B1 | 6/2001 | Maimets |
| 2002/0069837 A1 | 6/2002 | Genser |
| 2006/0033330 A1 | 2/2006 | Neuhaus et al. |
| 2006/0273579 A1 | 12/2006 | Ford et al. |
| 2008/0003092 A1 | 1/2008 | Baclija et al. |
| 2008/0016950 A1 | 1/2008 | Kubala |
| 2008/0047329 A1 | 2/2008 | Breed |
| 2008/0106045 A1* | 5/2008 | Lembcke .............. F16J 15/3224 |
| 2011/0018255 A1* | 1/2011 | Takahashi ............. F16L 27/087 |
| 2017/0219100 A1 | 8/2017 | Kobayashi et al. |

* cited by examiner

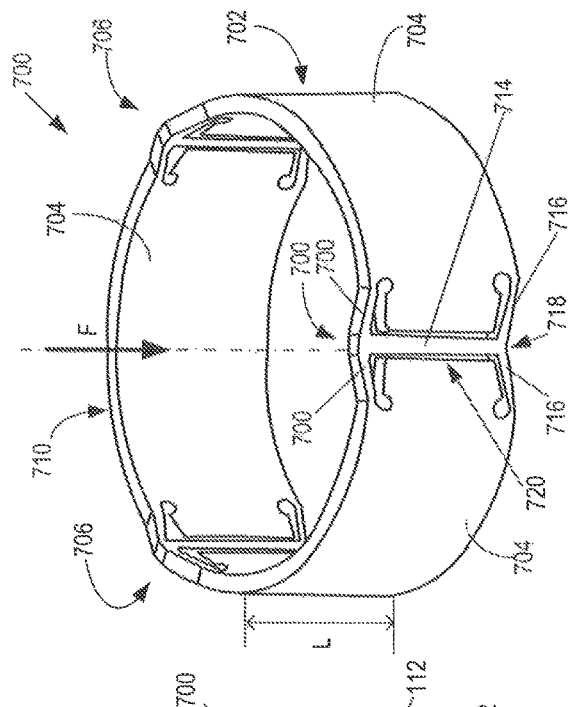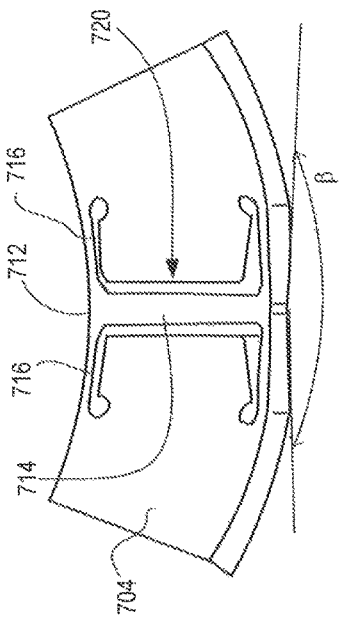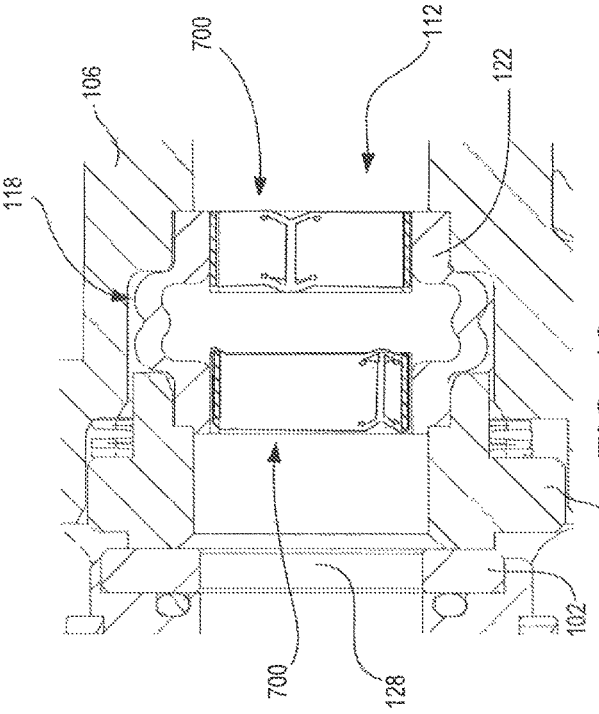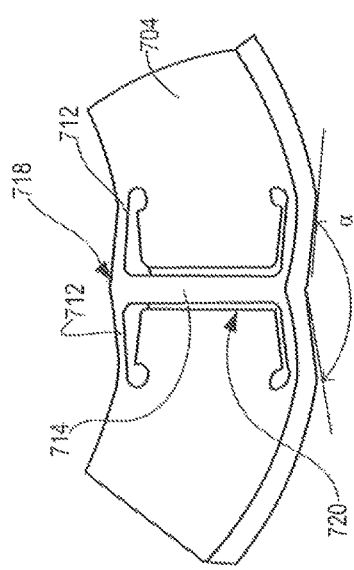
FIG. 14
FIG. 16
FIG. 13
FIG. 15

ROTARY UNION WITH EXPANDING RING

CROSS-REFERENCE TO RELATED APPLICATIONS

The present application claims the benefit of U.S. Provisional Patent Application Ser. No. 62/289,659, filed on Feb. 1, 2016, which is incorporated herein in its entirety by this reference.

TECHNICAL FIELD OF THE DISCLOSURE

The present invention relates to rotary devices such as rotary unions, swivel unions, slip rings and the like.

BACKGROUND OF THE DISCLOSURE

Fluid coupling devices such as rotary unions are used in industrial applications, for example, machining of metals or plastics, work holding, printing, plastic film manufacture, papermaking, and other industrial processes that require a fluid medium to be transferred from a stationary source such as a pump or reservoir into a rotating element such as a machine tool spindle, work-piece clamping system, or rotating drums or cylinder. Often these applications require relatively high media pressures, flow rates, or high machine tool rotational speeds.

Rotary unions used in such applications convoy fluid medium used by the equipment for cooling, heating, or for actuating one or more rotating elements. Typical fluid media include water-based liquids, hydraulic or cooling oils, air, and others. In certain instances, for example, when evacuating media from a fluid passage, rotary unions may operate under vacuum. Machines using rotary unions typically include precision components, such as bearings, gears, electrical components, and others, that are expensive and/or difficult to repair or replace during service. These components are often subject to corrosive environments or to damage if exposed to fluid leaking or venting from the rotary union during operation. Fluid leaking from a union is also typically undesirable.

A rotary union typically includes a stationary member, sometimes referred to as the housing, which has an inlet port for receiving fluid medium. A non-rotating seal member is mounted within the housing. A rotating member, which is sometimes referred to as a rotor, includes a rotating seal member and an outlet port for delivering fluid to a rotating component. A seal surface of the non-rotating seal member is biased into fluid-tight engagement with the seal surface of the rotating seal member, generally by a spring, media pressure, or other method, thus enabling a seal to be formed between the rotating and non-rotating components of the union. The seal permits transfer of fluid medium through the union without significant leakage between the non-rotating and rotating portions. Fluid medium passing through the rotary union may lubricate the engaged seal surfaces to minimize wear of the seal members. When a rotary union is used with non-lubricating media (such as dry air) or without any media, the engaged seal surfaces experience a "dry running" condition, which causes rapid seal wear due to lack of adequate lubrication. Extended periods of dry running can cause severe damage to the seal members, thereby requiring expensive and time-consuming replacement of one or both seal members.

High-speed machining equipment, such as computer-numerical-control (CNC) milling machines, drilling machines, turning machines, transfer lines, and so forth, use rotary unions to supply a medium directly to the cutting edge of a tool for cooling and lubrication in an arrangement that is commonly referred to as "through spindle coolant." A through spindle coolant arrangement extends the service life of costly cutting tools, increases productivity by allowing higher cutting speeds, and flushes material chips that can damage the work-piece or cutting tool away from the cutting surfaces of the tool. Different work-piece materials typically require different media for optimal productivity and performance. For example, air or aerosol media may provide better thermal control when machining very hard materials, while liquid coolants may offer better performance when machining softer materials, such as aluminum. In addition, certain kinds of work may be performed more effectively and less expensively without a through-spindle medium.

A variety of designs intended to avoid dry running with non-lubricating media or no media are known. For example, rotary unions having seal surfaces that disengage when opposing fluid pressures are present, such as the arrangement disclosed in U.S. Pat. No. 5,538,292, can be complex and expensive to manufacture. Rotary unions having seal surfaces that disengage automatically in the absence of media, such as the arrangement disclosed in U.S. Pat. No. 4,976,282, are less complex to manufacture and incorporate in a machine, but are prone to engagement of the seal surfaces when non-lubricating media is used. Seal surfaces with special geometries for non-contacting operation with gases, such as those disclosed in U.S. Pat. Nos. 6,325,380 and 6,726,913, do not provide effective sealing with liquid media. Similarly, seal surfaces with special geometries to distribute the medium evenly, such as the seal arrangement disclosed in U.S. Pat. No. 6,149,160, offer no advantage when non-lubricating media is used. Rotary unions that engage the seal surfaces at all times, even with a reduced bias, such as the unions disclosed in U.S. Pat. No. 6,929,099, are prone to damage from dry running at high rotating speeds.

However, even with use of improved sealing and mechanisms to avoid dry running of unions, any union will eventually require repair or replacement. Some machine operators may replace unions periodically to prevent a sudden loss in performance, or may operate a machine with a union that requires replacement. Such and other measures typically have costly consequences. Periodic inspections of unions are also time consuming and costly as unions are typically found within a machine and require effort by a technician to access them and assess their condition.

BRIEF SUMMARY OF THE DISCLOSURE

The disclosure describes, in one aspect, a rotary union. The rotary union includes a housing having a fluid inlet, a rotating machine component rotatably supported in the housing, a rotating seal member associated with the rotating machine component, a non-rotating seal member slidably and sealably disposed within the housing adjacent the rotating seal member, an expandable seal disposed between and sealably engaging a bore in each of the non-rotating seal member and the housing, wherein the expandable seal includes two end portions, one of the two end portions engaged to the non-rotating seal member and the other of the two end portions engaged to the housing, and an internal clamp disposed within an end portion of the expandable seal such that the end portion of the expandable seal is compressed between the internal clamp and the bore of the housing.

In another aspect, the disclosure describes a rotary union that includes a housing having a fluid inlet, a rotating machine component rotatably supported in the housing, a rotating seal member associated with the rotating machine component, a non-rotating seal member slidably and sealably disposed within the housing adjacent the rotating seal member, an expandable seal disposed between and sealably engaging a bore in each of the non-rotating seal member and the housing, the expandable seal including two end portions, one of the two end portions engaged to the non-rotating seal member and the other of the two end portions engaged to the housing, an expandable ring disposed within an end portion of the expandable seal such that the end portion of the expandable seal is compressed between the expandable ring and the bore of the housing, and a second expandable ring disposed within an end portion of the expandable seal such that the end portion of the expandable seal is compressed between the second expandable ring and the bore of the non-rotating seal member.

In yet another aspect, the disclosure describes a method for manufacturing a rotary union. The method includes slidably and sealably mounting a non-rotating seal member in a housing adjacent a rotatable seal member, mounting an expandable seal between a bore in each of the non-rotating seal member and the housing, the expandable seal including two end portions, one of the two end portions engaged to the non-rotating seal member and the other of the two end portions engaged to the housing, and inserting an expandable ring within an end portion of the expandable seal such that the end portion of the expandable seal is compressed between the expandable ring and the bore of the housing.

BRIEF DESCRIPTION OF THE SEVERAL VIEWS OF THE DRAWINGS

FIG. 13 is an enlarged, detail view of an expanding ring for use with an expanding seal in accordance with the disclosure.

FIG. 14 is an outline view of an expanding ring in accordance with the disclosure.

FIGS. 15 and 16 are partial, outline views of the expanding ring of FIG. 14 shown in its natural and expanded conditions.

DETAILED DESCRIPTION

Figure 1:
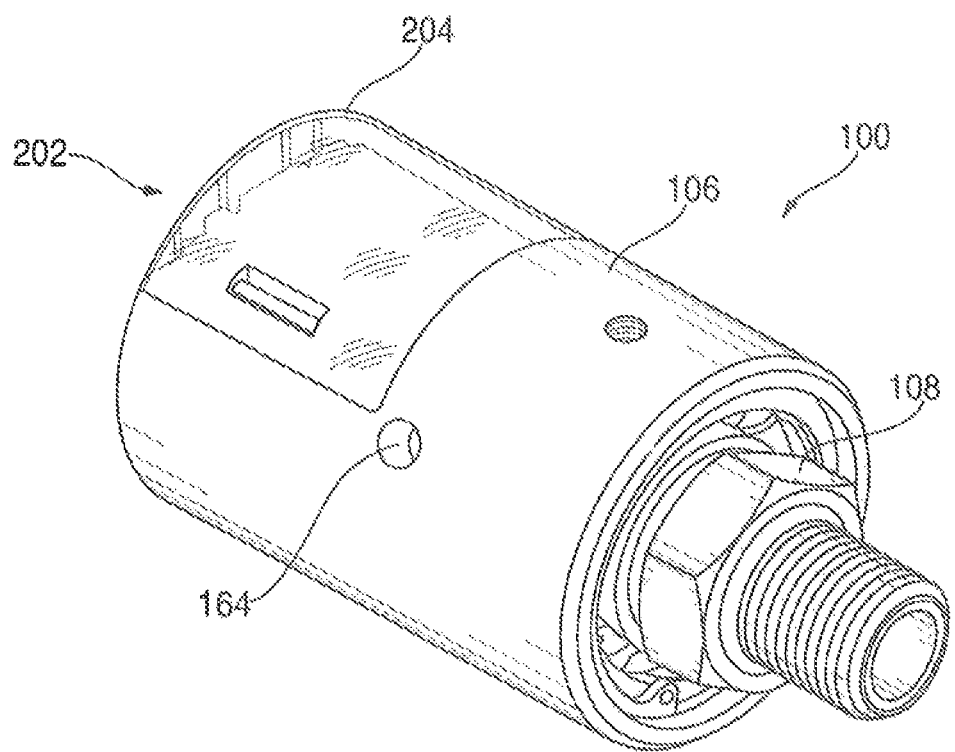
FIG. 1 is a perspective view of a rotary union in accordance with the disclosure.
Figure 2:
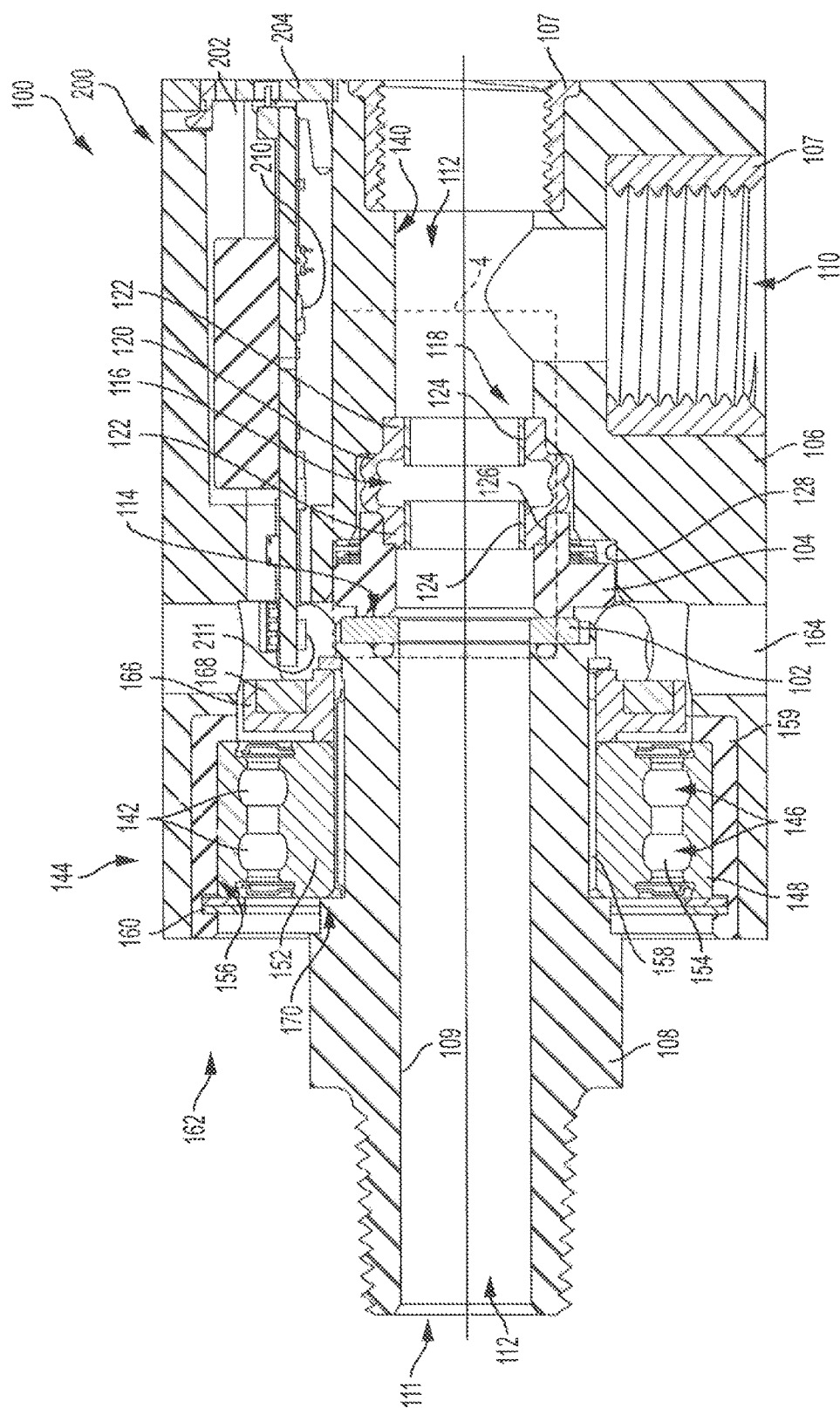
FIG. 2 is section view of the rotary union shown in FIG. 1.

In the drawings, which form a part of this specification, FIG. 1 shows a perspective view of a rotary union 100, and FIG. 2 shows a section view through the rotary union 100 to illustrate various internal components. It should be appreciated that in the exemplary embodiments shown herein, a rotary union is illustrated but the systems and methods described in the present disclosure are equally applicable to any rotary device that includes stationary and fully or partially rotatable components in sliding contact with one another. Examples of rotary devices, therefore, can include rotary unions or swivel joints, which are used to convey fluids through fully or partially rotatable joints or components, and can also include devices for connecting electrical leads across fully or partially rotatable interfaces such as slip rings. In reference to the exemplary rotary union illustrated herein, the rotary union 100 includes a rotating seal member 102 and a non-rotating seal member 104 that is axially moveable relative to a housing 106. A segmented conduit or media channel 112 extends through the housing 106, and also the rotating and non-rotating seal members 102 and 104 respectively.

Portions of the media channel 112 are defined in different components of the rotary union 100 to provide a fluid passageway through the rotary union 100 when the rotating and non-rotating seal members 102 and 104 are engaged. The media channel 112 may be selectively arranged to sealingly enclose fluids when the rotating and non-rotating seal members 102 and 104 are engaged to one another, and be open for venting to the atmosphere when the rotating and non-rotating seal members 102 and 104 are not engaged.

The rotating seal member 102, which is embodied here as a seal ring attached to the rotating machine component 108, but which may alternatively be integrated with the rotating machine component 108, can be any type of machine component such as a spindle on a CNC milling machine. A mechanical face seal created when the rotating seal member 102 is engaged with the non-rotating seal member 104 seals the media channel 112 for transferring a fluid medium from a fluid inlet 110 of the housing 106 to an outlet 111 formed at the end of the rotating machine component 108, as is known in the art. The rotating machine component 108 has a bore 109 that defines a portion of the media channel 112.

The non-rotating seal member 104 is slidably and sealingly disposed within a bore 128 of the housing 106. The structural arrangement permitting sliding of the non-rotating seal member 104 relative to the non-rotating machine component 110 enables the selective engagement and disengagement of the non-rotating seal member 104 with the rotating seal member 102, and compensates for axial displacement that may be present between the rotating machine component 108 and the housing 106.

The selective variation of fluid pressure within the media passage 112 during operation of the rotary union 100 yields net hydraulic forces that are applied to urge the moveable non-rotating seal member 104 to move relative to the housing 106 such that a sealing engagement can occur along an interface 114 between the rotating seal member 102 and the non-rotating seal member 104. Extension of the seal member 104 relative to the housing 106 and engagement of corresponding sealing surfaces formed at opposing faces of the rotating seal member 102 and the non-rotating seal member 104 create a fluid passage along the media channel 112. The non-rotating seal member 104 may be keyed into its receiving bore in the housing 106 to prevent its rotation, especially when sealing engagement exists between the rotating seal member 102 and the non-rotating seal member 104.

Figure 3:
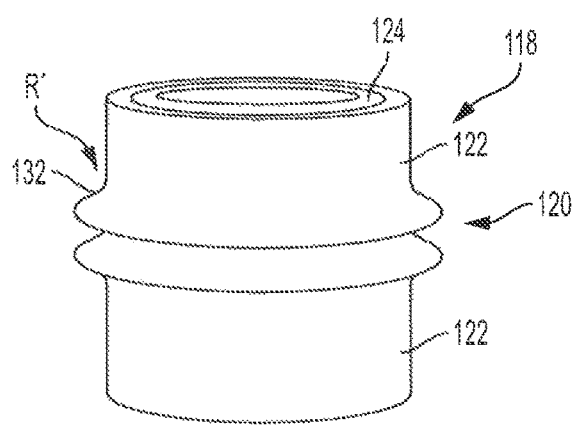
FIG. 3 is a perspective view.

The housing 106 sealingly engages the non-rotating seal member 104, and defines various hydraulic chambers therein for the selective engagement between the rotating and non-rotating seal members 102 and 104. More specifically, the housing 106 includes a stepped bore portion 116 that accommodates therein and sealably engages one end of an expanding seal 118, which is formed with a bellows portion 120 that is disposed between straight portions 122 (also see FIG. 3 and the enlarged detail sections shown in FIG. 4A and FIG. 4B). The expanding seal 118 may be formed of an elastic material such as rubber, TPE, a fluoroelastomer, and other materials, and includes rigid collars 124 along the straight portions 122. The expanding seal 118 engages the stepped bore portion 116 at one end, and a recess 126 formed in the non-rotating seal member 104 at another end. When the non-rotating seal member 104 is urged by hydraulic forces to move towards engagement with the rotating seal member 102, the expanding seal 118 expands in an axial direction as the bellows portion 120 increases in length along a centerline 128 of the expanding seal 118, which in the illustrated embodiment has a generally cylindrical shape that is disposed concentrically with the rotating machine component 108 and the rotating seal member 102.

Figure 4A:
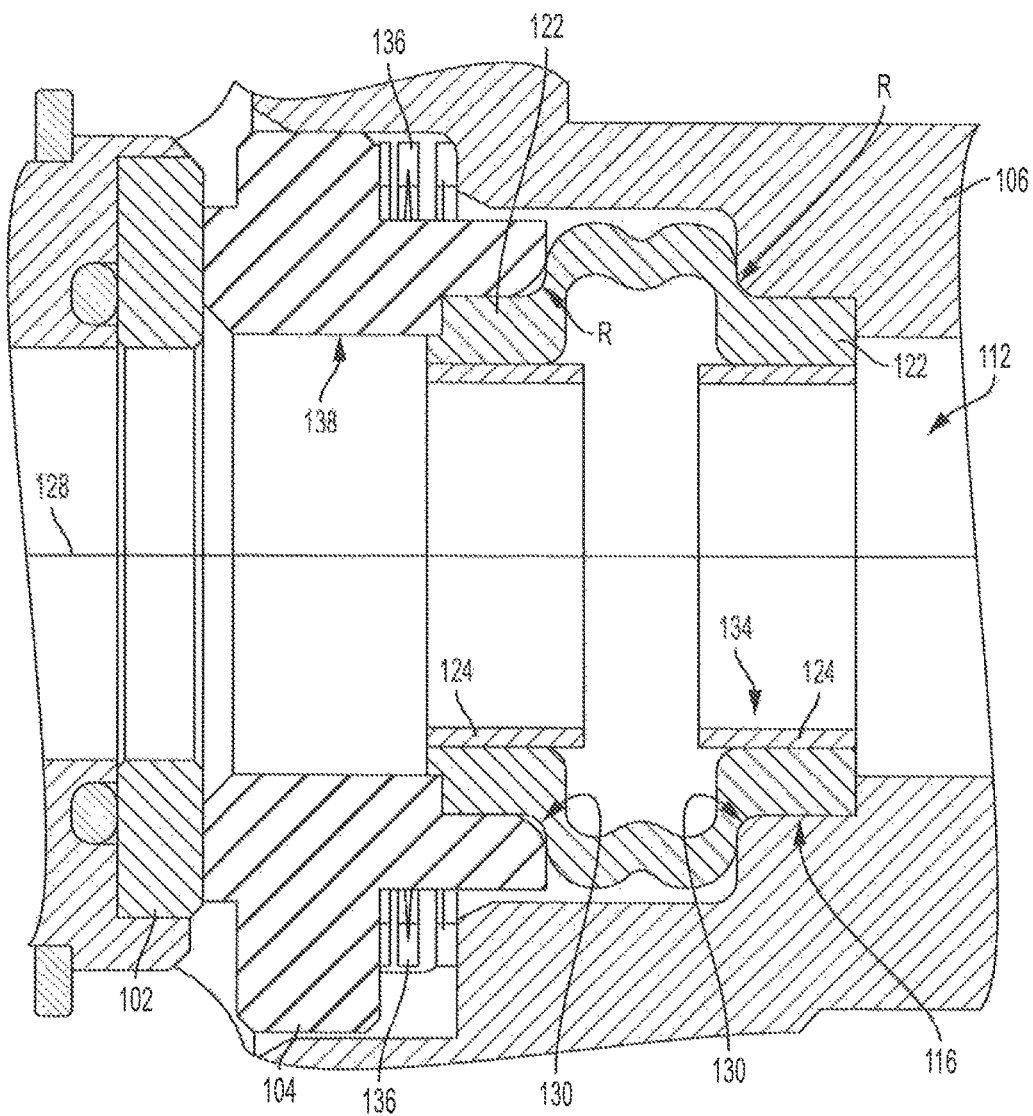
FIG. 4A is an enlarged, detail view of a seal in accordance with the disclosure.
Figure 4B:
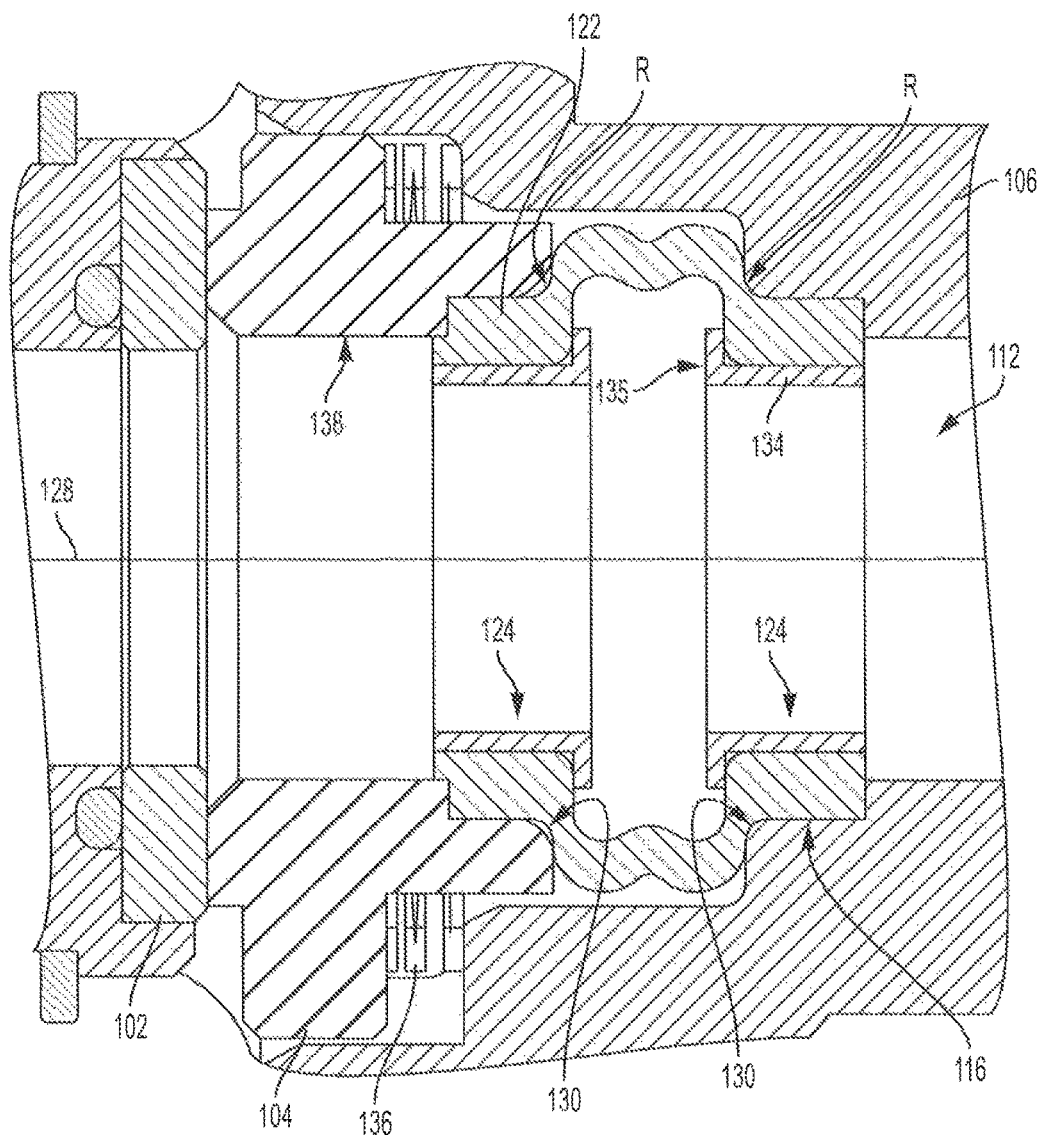
FIG. 4B is an enlarged, detail view of an alternative embodiment of a collar for a seal in accordance with the disclosure.

As can be seen in FIGS. 4A and 4B, the stepped bore portion 116 and the recess 126 form rounded or chamfered edges facing the expanding seal 118 to help retain the seal in place and also to avoid possible damage or tears to the seal material during use. Specifically, these edges, which are denoted as edges 130 in FIGS. 4A and 4B, have a radius of curvature, R, that generally matches a radius of curvature, R', of an interface 132 between the straight portions 122 and the bellows portion 120 on the expanding seal 118 (see FIG. 3). The compatibility of the radii at the area of contact between the interface 132 and the edges 130 ensures a low-stress contact between moving or deforming portions of the expanding seal 118, the housing 106 and the non-rotating seal member 104.

During operation of the rotary union 100, the expandable seal 118 is generally retained in place because it axially constrained at both ends by the housing 106 and the non-rotating seal member 104. The expandable seal 118 is also radially retained in place through the engagement of the outer cylindrical surface of the straight portion 122 with an inner cylindrical surface of the stepped bore portion 116. Such engagement may be sufficient to maintain the expandable seal 118 in position during operation with no internal pressure, or positive pressure. However, if the media channel 112 is exposed to negative pressure (vacuum), such as may be used to evacuate fluids within the media channel 112, the possibility may exist that the expandable seal may elastically deform, at least temporarily, and especially in areas along the radially outer cylindrical contact interfaces with the straight portions 122.

To ensure that continuous contact is present along the straight portions, the collars 124 are inserted internally in the straight portions 122. Each collar 124 forms a shaft section 134, which has a hollow cylindrical shape, and may optionally also include a ledge 135 (shown in FIG. 4B), which extends radially outwardly relative to the shaft section. The ledge 135 may extend radially outwardly with respect to the shaft section 134 to an outer diameter that is larger than a typical inner diameter 138 of the media channel 112, or at least an inner diameter of a component that surrounds the expandable seal 118 such as the non-rotating seal member 104 and an opening 140 in the housing.

When inserted into each straight portion 122, each collar may be oriented such that the ledge 135 is disposed on the side of the bellows portion 120. In the illustrated embodiment, where no ledge is included, the collars 124 are inserted fully into each respective straight portion 122 such that they fully cover, in an axial direction, an engagement region of the straight portions 122 with the housing or non-rotating seal member. When the expandable seal 118 is installed in the rotary union 100, and the collars 124 are in position, each collar 124 is sized to impart a preselected radially outward and compressive force into the straight portion 122 of the expandable seal 118 to provide a sealing engagement between the two ends of the expandable seal 118 and the respective mating component, which as can be seen in FIGS. 4A and 4B includes the housing 106 and the non-rotating seal member 104. When lubricants are used in the media channel 112, which may enter along the interfaces between the expandable seal 118 and the components in which it is installed, an axial force may tend to push either end of the seal axially with respect to its mating components. To limit such sliding conditions, the collar 124 acts to limit the axial motion of the straight portions 122.

An alternative embodiment for the collar 124 is shown in FIG. 13, where both collars 124 have been replaced by a respective internal clamp embodied as an expanding ring 700. An outline view of the expanding ring 700 is shown in FIG. 14, and two partial outline views of the expanding ring 700 are shown in FIG. 15, where the expanding ring 700 is in a natural or retracted condition, and in FIG. 16, where the expanding ring 700 is in an enlarged or expanded position. In reference to these figures, the expanding ring 700 has a generally hollow cylindrical shape that includes a segmented wall 702. In the illustrated embodiment, the segmented wall 702 is made from three arcuate wall segments 704 that are resiliently connected to one another by resilient structures 706. The resilient structures 706, as will be described hereinafter, flexibly and/or resiliently connect the arcuate wall segments 704 to one another such that, when the expanding ring 700 is subjected to an axial load along its centerline 708, the resilient structures 706 translate the axial load into a tangential load along a periphery of the wall 702 to expand the periphery by allowing the arcuate wall segments 704 to move in a radially outward direction and increase the overall outer diameter of the expanding ring 700. Similarly, when the axial loading is removed or reduced, the resilient structures 706 permit a contraction of the arcuate wall segments 704 towards one another in a radial direction to, thus, restore or reduce the overall outer diameter of the expanding ring 700 to its original, natural dimension.

In the illustrated, exemplary embodiment, the expanding ring 700 is made of a metal such as steel. The structure of the expanding ring 700 is manufactured by cutting various segments, for example, by laser cutting, into a section or length of tubular material. As shown, the expanding ring 700 is made from three arcuate wall segments 704 that are interconnected by three resilient structures 706, but a different number of arcuate wall segments and resilient structures may be used.

Each arcuate wall segment 704 extends over a chord of about 120 degrees around a periphery 710 of the expanding ring 700. Each resilient structure 706 is made by two leaf spring portions 712 that are connected to one another by a synchronizer bar 714. Each resilient structure 706 includes two leaf spring portions 712 having an axial thickness that is about equal to a wall thickness of the arcuate wall segments 704 and are disposed at either axial end of the expanding ring 700. Each leaf spring portion 712 includes two legs 716 that meet at an apex 718. The legs 716 are connected on one end with a corner of an adjacent arcuate wall segment 704 and at another end to the apex 718. While the material that makes up the legs 716 is integrally formed with the material that makes up the apex 718 and also the material that makes up the adjacent wall segment 704, elastic deformation of the material around each end of each leg 716 provides a pivoting connection between each leg 716 and the corresponding apex 718 and adjoining arcuate wall segment 702. Similarly, each synchronizer bar 714 is connected between two apices 718 such that each apex 718 provides a connection that allows the legs 716 and the synchronizer bar 714 to pivot relative to one another.

In a natural or unloaded condition, the legs 716 are disposed at an obtuse angle, α, relative to one another in a "V" or chevron configuration. As shown in FIG. 14, all three sets of legs 716 are oriented in the same direction in this respect on a given expanding ring 700. When installed in a rotary union, as shown in FIG. 13, the two expanding rings 700 may be installed such that the apices 718 of the innermost resilient structures 706 are closest to one another or, stated differently, the chevron shapes of the legs 716 in both rings 700 open away from each other.

The orientation of the legs 716 in the expanding ring 700 advantageously provides a directional reaction to an application of axial force onto the ring such that expansion of the ring results from the application of an axial load in one direction, and contraction of the ring results from the application of an axial load in the opposite direction. In the embodiment shown herein, expansion of the ring will result when an axial force is applied in a direction tending to push the two rings 700 away from one another, in the arrangement shown in FIG. 13, or in a direction from the top towards the bottom of the ring in the orientation shown in FIG. 14. When an axial force is applied in a direction, F, as shown in FIG. 14, along the axis 708, the ring will expand. Stated differently, if a hydraulic pressure difference is applied on an inner surface of the ring 700, the ring will expand and react by providing an axial force tending to push the rings together in the orientation shown in FIG. 13. The reaction of this axial force will thus tend to push the ends of the expandable seal 118 apart. This application of force is due to the shape and arrangement of components in the resilient structures 706.

At the natural condition of the ring 700, as shown in FIG. 15, both sets of legs 716 of a resilient structure 706 are disposed at the angle, α, and the synchronizer leg 714 is axially displaced relative to the axial length, L, of the wall 702. When internal, hydraulic or pneumatic pressure is applied to the wall 702, or when the expanding seal 118 is extended, an axial load is created that tends to expand the ring 700. As the ring 700 expands, an angle between the leaf spring portions 712 will increase or, stated differently, the angle between the legs 716 will increase from the natural angle, α, to an increased angle, β, as shown in FIG. 16.

In the expanded condition, the angular displacement between the pairs of legs 716 at each apex 718 of any one resilient structure 706 will be the same because of the connection between the two apices 718 provided by the synchronizer bar 714. Further, a gap 720 between the edges of the synchronizer bar 714 that face the arcuate wall segments 704 and the edges of the arcuate wall segments 704 that face the synchronizer bar 714 will increase proportionally to the cosine of the difference between the angle β and the angle α. Because the increase in the gap will also increase the overall periphery 710 of the ring, the increase in the periphery can be expressed by the following relation:

$$\delta P = f(\cos(\beta) - \cos(\alpha)) * C$$

where δP is a change in the periphery 710 and C is here considered a constant that accounts for the constant, π, and also certain material properties and geometrical relations between the various material components, but it should be appreciated that, for larger dimension rings, the quantity of C may not be constant and may depend on the periphery of the ring and other dimensions.

It should be appreciated that the expanding ring 700 may also be used in a locked, expanded position, in which the resilience of the resilient structures 706 is sacrificed in favor of a constant, gripping force provided by an expanded periphery 710, especially in applications where an increased radial retaining force is desired. In such a condition, upon installation or initial service of the ring 700, an axial force may be provided that pushes the resilient structures 706 past their elastic deformation limits and plastically deforms the material at the junctions between the legs 716 and their surrounding components, which essentially will drive the angle, β, shown in FIG. 16 closer to an angle of 180 degrees. In this condition, the ring 700 will assume an over-center locked state and will attain its maximum outer diameter. When using the ring 700 in the over-center locked position, the ring 700 serves as an internal clamp used to retain elastic materials such as rubber sleeves or hoses engaged within a bore formed in a component by applying a force in a radially outward direction tending to compress the material of the article being retained from within.

Depending on the uncompressed length of the expandable seal 118 along its centerline, the expandable seal 118 can also be used to provide a pre-load or pre-tension to the rotating and non-rotating seal members 102 and 104. Such pre-tension may be augmented or supplemented in a static fashion by springs 136, which are illustrated in the exemplary embodiment of FIG. 4A and are shown as compression springs. More specifically, where certain rotary unions may include a spring tending to push the seal members into contact with one another, the spring and other secondary seals can be eliminated and replaced or assisted, as in the illustrated embodiment, by the expandable seal 118, which fulfills the role of maintaining a fluid seal as the non-rotating seal member 104 moves with respect to the housing 106, and also can be selected such that it fulfills the role of pre-tensioning the seal members, i.e. pushing the seal members towards a seal engagement direction towards one another in an elastic fashion, if the length of the expandable seal 118 is selected to be larger than the axial opening for the seal that is provided. Dynamically, when a fluid under positive gage pressure is present in the media channel 112, the biasing force of the expandable seal 118 may be further augmented by a hydraulic force tending to expand the seal. In the illustrated embodiments, the expandable seal 118 includes a bellows with two convolutions, or bellows that are generally M-shaped, but a single or more than two convolutions can be used.

In reference now back to FIGS. 1 and 2, the rotary union 100 further includes two roller hearing assemblies 142 disposed between the housing 106 and the rotating machine component 108. More specifically, the housing 106 forms a bearing region 144 that accommodates one or more bearings 146, two of which are shown in the illustrated embodiment. The bearings 146 are shown as ball bearings, each including an outer race 148, an inner race 152, and a plurality of balls 154 disposed therebetween. Each outer race 148 and inner race 152 is formed as a ring, where the outer race 148 radially engages an inner generally cylindrical surface 156 of the bearing region 144 of the housing 106, and where the inner race 152 engages an outer generally cylindrical surface 158 of the rotating machine component 108. In the illustrated embodiment, the inner surface 156 of the bearing region 144 is formed in a metal insert 159 that is inserted and connected to the otherwise plastic housing 106.

The bearings 146 are axially constrained within the inner generally cylindrical surface 156 by C-rings 160. When the C-rings 160 are sequentially removed, the entire assembly of rotating and non-rotating components and seal members can be removed from the housing 106 through a front opening 162 to advantageously facilitate assembly, disassembly and service of the rotary union 100. An inner C-ring 160 is disposed closer to the non-rotating seal member 104 and is engaged along an inner diameter thereof around the rotating machine component 108. An outer C-ring 160, which is disposed closer to the front opening 162, is engaged along an outer diameter thereof within the inner generally cylindrical surface 156 of the bearing region 144 of the housing 106. The housing 106 further forms one or more drain opening(s) 164 adjacent the sealing interface between the rotating seal member 102 and the non-rotating seal member 104.

A rotor 166, which axially occupies a space between the inner bearing 146 and an annular end-surface of the bearing region 144, has a generally disc shape and is disposed around an inner end of the rotating machine component 108. The rotor 166 includes one or more magnets 168 disposed at regular angular intervals around a periphery thereof. An outer ledge 170 formed on the rotating machine component 108, in cooperation with the bearings 146 and the rotor 166, help to axially constrain and rotatably mount the rotating machine component 108 and the rotor 166 with respect to the housing.

The rotary union 100 described herein may be manufactured and assembled by various methods. In the illustrated embodiment, the main components of the rotary union 100, such as the housing 106, the rotating machine component 108 and, possibly, the rotor 166, are manufactured by use of plastic materials, which may be formed in any suitable way, including by use of three-dimensional printing machines. Metal inserts 107 may be added at the fluid interfaces of the housing 106. Alternatively, and depending on the operating environment of the rotary union, the type and temperature of the fluid that will at times occupy the media channel 112, some or all of these and other components may be manufactured using different materials such as metal and different manufacturing methods.

Figure 5:
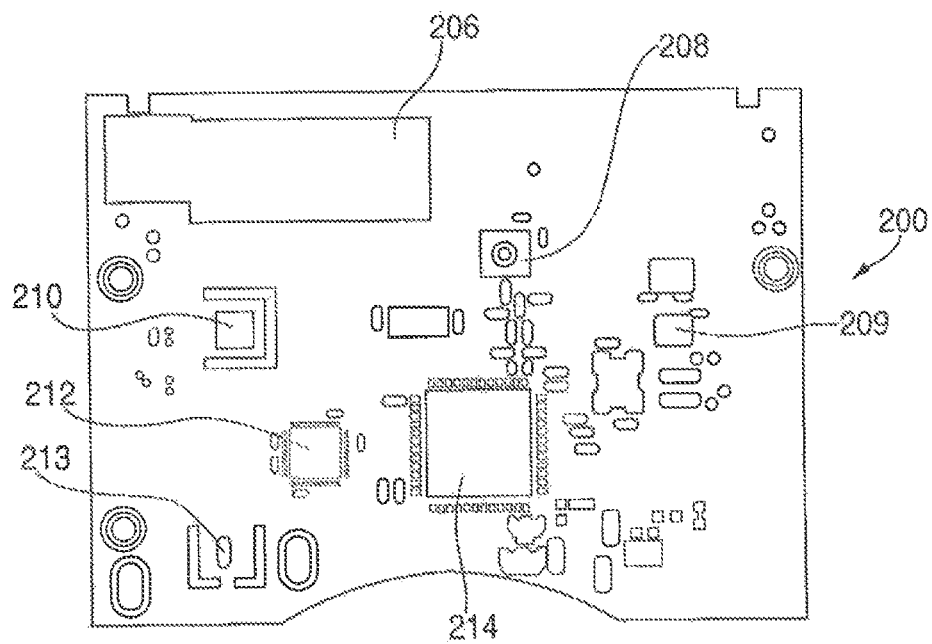
FIGS. 5 and 6 are different views of a sensor module in accordance with the disclosure.

Relevant to the present disclosure, the rotary union 100 further includes a sensor array 200 disposed in a pocket 202 that is defined in the housing 106 and enclosed by a cover 204, as shown, for example, in FIGS. 1 and 2. In the illustrated embodiment, the pocket 202 is shown to be fluidly separated or isolated from the media channel when the rotating and non-rotating seal members 102 and 104 are in contact. Further, the sensor array 200 has a portion that protrudes from the pocket and overlaps axially one of the drain openings 164 and also an interface of the rotating and non-rotating seal rings 102 and 104. The sensor array 200 in the illustrated embodiment is a fully-operative sensor array that includes one or more sensors arranged on a substrate, which also includes power and communication devices. In general, any type of fully-operative or independent sensor array may be used. Exemplary illustrations of the sensor array 200, which inhabits a circuit board 206, is shown from both sides in FIGS. 5 and 6. In reference to FIG. 5, which shows a front side of the array 200, the sensor array includes various components, including an antenna 206, a radio frequency connector 208, an accelerometer 209, two infrared (IR) temperature sensors 210 and 211, a motion sensor 212, a humidity sensor 213, a micro-control unit (MCU) 214, but other sensors and devices may be used. As shown, the first IR temperature sensor 210 is disposed to measure a temperature of the housing 106, and the second IR temperature sensor 211 is disposed adjacent the non-rotating seal member 104 and configured to measure a temperature of the rotating and/or non-rotating seal members 102 and 104. Additional sensors may include fluid pressure sensors, strain gauges, and other sensors used for detecting, directly or indirectly, a pressure of the fluid media present in the media channel.

Figure 6:
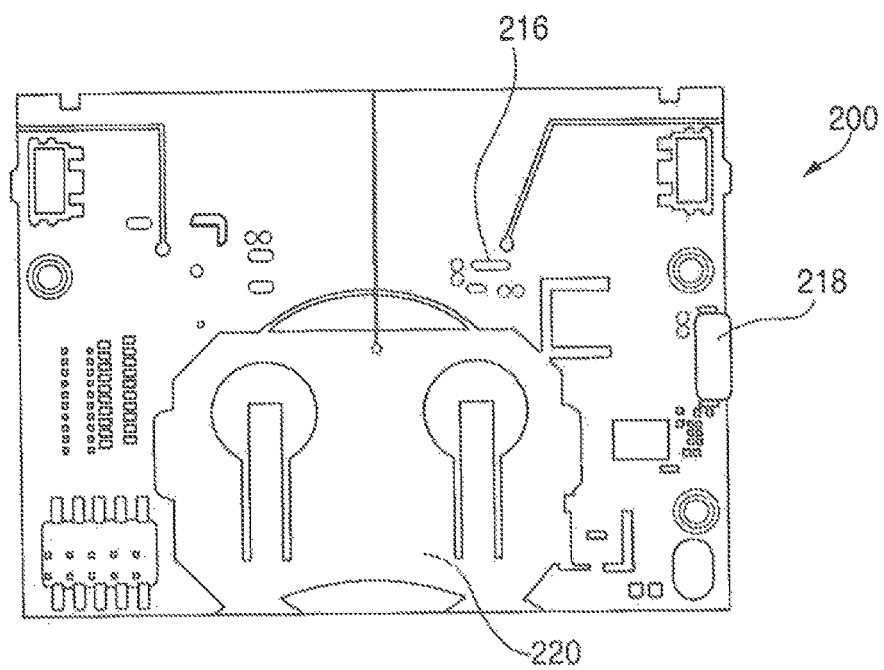

On its back side, as shown in FIG. 6, the sensor array 200 includes a memory storage device 216, a magnetic pickup sensor 218, a power storage device 220, and other devices. These various devices and sensors may be used to advantageously detect, track, monitor, alert, notify and infer various operating parameters of the rotary union that can he used to determine the operating state and general operational parameters which could be used to determine the "health" of the rotary union 100 and the machine in which the rotary union 100 is operating. Data gathered could also be used to compare, analyze and optimize operations.

In one contemplated embodiment, the magnets 168 disposed along the rotor 166 may be used to generate a rotating magnetic field during operation of the union 100, which can be used to generate electrical power at a coil to charge a power storage device 220 or, in general, to power the sensor array 200. The coil, which can be embodied along with the magnetic pickup sensor 218, or another equivalent electrical component, can provide a solution for powering the sensor array 200 as well as recharging the battery, thus eliminating the need to periodically change batteries. Along these lines, other power sources may be used such as piezoelectric elements operating to generate electrical potential when the union vibrates, photovoltaic cells for applications where the union is exposed to natural or artificial lighting, and the like. In an alternative embodiment, the power storage device 220 may be embodied as a battery, which can be replaced when its power has depleted, or it can also be a connection for a wired supply of electrical power from an external source.

More specifically, various signals indicative of the physical conditions of the rotary union and its surrounding environment can be generated by the various sensors in the sensor array 200 and communicated to the MCU 214 for processing and/or transmission to an external receiver for relay to a machine operator or monitor. In the exemplary embodiment shown and described in the present disclosure, the antenna 206 and/or radio frequency connector 208 may be used to effect wireless communication of information to and from the sensor array, as will be described below relative to FIG. 7. Regarding the various sensor signals that can be used to determine or monitor rotary union health, the temperature sensor 210 may be used to monitor the temperature of, or the space or material immediately around, the rotary union 100 as an indication of the condition of the rotating and non-rotating seal members 102 and 104. Additionally, this or other sensors or sensor arrays may be used to monitor and record fluid pressure and/or fluid temperature of the working media. In this respect, dry running or excessive friction at the sealing interface during operation will raise the temperature of the seal members relative to the housing, and thus heat the surrounding structures in the rotary union, which will cause an increase in the temperature sensed by the temperature sensor 211, which will be reflected in the temperature signal provided to the MCU 214 as a temperature difference that can be used to determine a seal failure.

Similarly, other sensors may be used to determine the operating state of the rotary union 100. The humidity sensor 213 may be used to sense the presence or an increase in humidity, which can be an indication of seal leakage. In one embodiment, to avoid false-positive leakage signals, the MCU 214, in the presence of cold fluid passing through the media channel 112 in a humid environment, may detect humidity from condensation and not signal a leakage unless additional indications of a leakage are provided, for example, a heating of the seal interface and fluid motion through at least one of the drain openings. The magnetic pickup sensor 218 may sense the magnets 168 (FIG. 2) as they pass by the sensor 218 while the rotary union 100 operates and the rotor 166 (FIG. 2) is rotating to provide an indication of the speed of rotation, and also of the number of revolutions the rotary union has undergone, which in conjunction with a counter can provide an indication of the service life of the rotary union 100. The accelerometer 209 may sense vibration in the rotary union 100 to provide an indication of the balance and, thus, the structural state of the rotating components within the rotary union 100 and those components connected to the union to detect structural issues associated with the rotary union 100 or the machine in which the rotary union 100 is installed. Other sensors may also be used to monitor and record flow rate and/or pressure of the fluid media.

Figure 7:
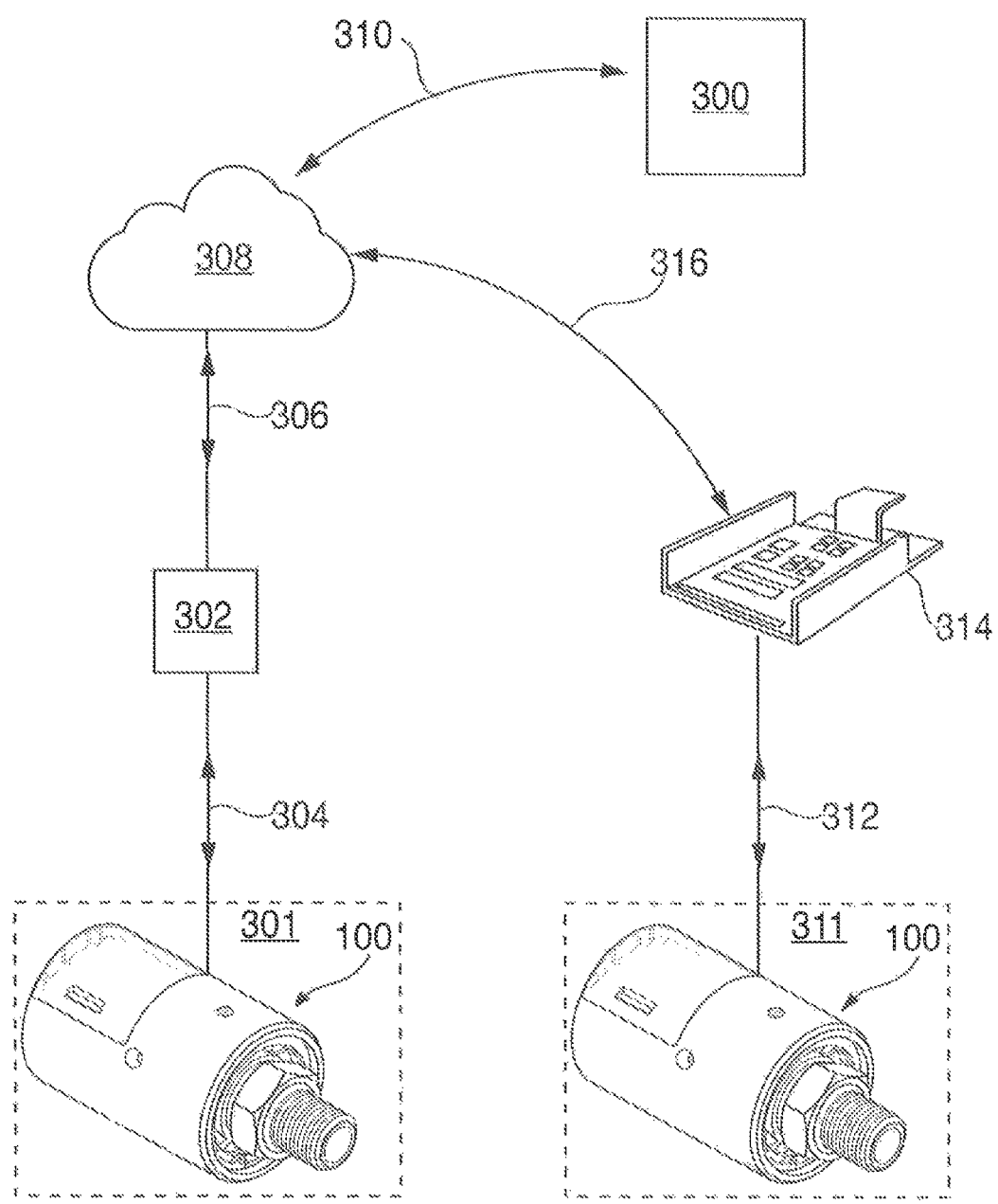
FIG. 7 is a schematic view of a union monitoring system or arrangement of components in accordance with the disclosure.

The various operating parameter signals generated by the sensors discussed above, and possibly additional or different signals generated by other sensors, may be continuously transmitted in real time, or at least during operation of the rotary union 100, to a control center 300, as shown in the schematic diagram shown in FIG. 7. FIG. 7 shows two out of numerous other possible embodiments for the wireless communication of information between the rotary union 100 and, specifically, the sensor array 200, and the control center 300. In the illustrated, exemplary embodiments, two options are shown.

In a first option, shown on the left side of FIG. 7, the antenna 206 (shown in FIG. 5) of a rotary union 100 installed in a machine 301 is configured to transmit and receive information either via an appropriate wireless network, and/or through a wired connection. In the illustrated embodiment, a local area network (LAN) 304 is used to communicate with a mobile computing device 302, but any other wireless network such as a wide area network (WAN), or a direct will connection may be used. The mobile computing device 302 may be embodied in any known type of device, including a Smartphone, tablet, portable computer, or wireless signal gateway device. The mobile computing device may be a handheld device or may alternatively be a device that is integrated with, or part of, a larger machine such as the machine 301 into which the rotary union 100 is installed and operating. In addition to the wireless connection to the network 304, the mobile computing device further includes an Internet connection 306 that connects the mobile computing device 302 to the Internet 308. The Internet connection 306 may be direct, for example, via a cellular data connection, or indirect such as over wifi. In one embodiment, the functionality of the control center 300 may be integrated locally into the mobile computing device 302, thus obviating the need for further connections. As can be appreciated, the Internet 308 may be part of the world wide web, or may alternatively be a distributed network operating in a cloud configuration across multiple locations simultaneously. In this arrangement, the control center 300 is configured to exchange information with the rotary union 100 via the Internet 308 by use of a dedicated connection 310. Because of the range limitations of certain types of networks, and also the flexibility of using a mobile computing device, the first option may be well suited for smaller installations where a handful of machines 301 are installed in relatively close proximity to one another. For larger installations, a second option may be used, which is shown on the right side of FIG. 7.

In the second option, the antenna 206 (shown in FIG. 5) of a rotary union 100 installed in a machine 311 is configured to transmit and receive information wirelessly in a dedicated low-power, local area network 312 or, in an alternative embodiment, a wide area network. The local area network 312 is a low-cost, low-power, wireless mesh network standard targeted at wide development of long battery life devices in wireless control and monitoring applications. Information over the network 312 may be managed by a dedicated gateway device 314, which may be a standalone device handling one or more rotary unions 100 operating in the same or multiple machines 311. The gateway traffics information from the network 312 to an Internet connection 216, which is connected to the Internet 308 and thus to the control center 300. Alternatively, the connection to the control center 300 may be made directly with the rotary union 100 in a configuration of the union that is capable of direct Internet connection. Apart from these two options, additional embodiments can include a direct wifi, wired network, or cellular data network connection between the rotary union 100 and the control center 300.

In the information exchange systems shown in FIG. 7, various diagnostic and monitoring functions relative to the rotary union 100 can be realized. For example, customized mobile applications operating in the mobile computing device 302, or specialized computer applications operating in computers located at the control center 300, can be used to monitor the operation of specific rotary unions 100 to assess their operating state either locally or remotely. Such applications can provide further advantages such as automating rotary union re-orders, to replace unions that are determined to be nearing their service life by use of these systems, providing troubleshooting guides for unusual operating conditions detected by the sensor arrays 200, and even providing a live connection to a customer or technical specialist via chat or phone connection when issues are encountered.

Figure 8:
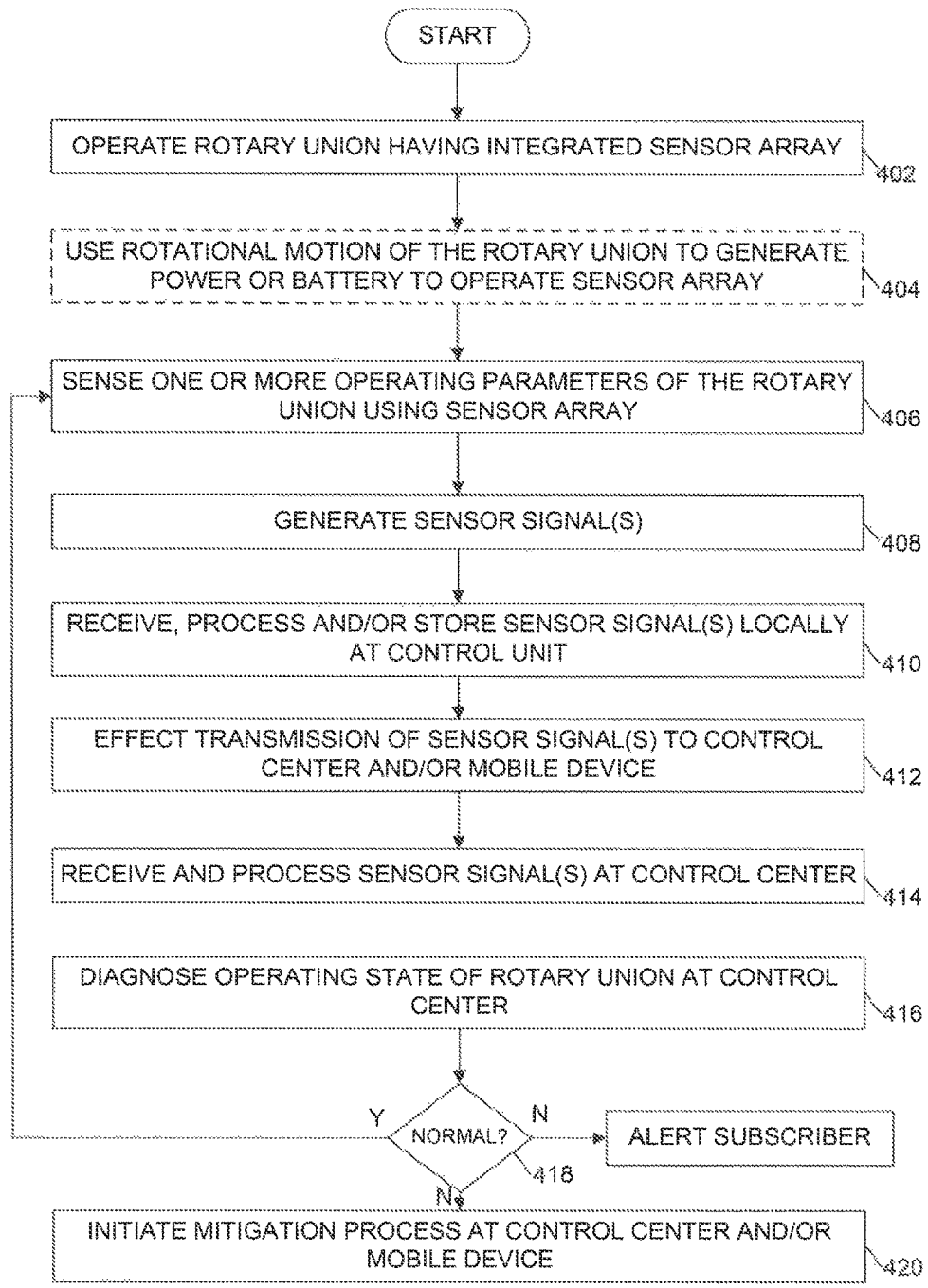
FIGS. 8-10 are flowcharts for methods in accordance with the disclosure.

A flowchart for a method of operating a rotary union is shown in FIG. 8. The method includes operating the rotary union in a machine at 402. In accordance with the disclosure, the rotary union includes a sensor array that is integrated with the rotary union and includes wireless communication capability. In an optional embodiment, operation of the rotary union includes using a rotational motion of the union to generate electrical power to operate the sensor array at 404. The method of operating the union further includes sensing one or more operating parameters of the rotary union using one or more sensors of the sensor array at 406. Each of one or more sensors generates a sensor signal at 408, which sensor signal is received and/or processed by a control unit at 410. The control unit 410 effects a transmission of the sensor signal(s) to a control center at 412. In one embodiment, the control unit 410 is further configured to store the sensor signals using an on-board memory storage device. The stored sensor signals, which may also include time-stamp, date and other information, may be available for later retrieval from the control unit. Moreover, the control center 412 may be a centrally located processing center for one or more unions, and additionally or alternatively may be a mobile electronic device that is present in close physical proximity to the rotary union, either permanently or transiently as an operator passes by the rotary union carrying the mobile electric device, for example, during a live inspection of the operating state of the union.

The control center receives and processes the sensor signal(s) 414 to diagnose an operating state of the rotary union at 416. In the event of an abnormal operating condition, which is determined at 418, the control center may initiate a mitigation process at 420, which includes but is not limited to informing a machine operator of the abnormal operating condition or, depending on the preferences of the operator, automatically recommend to the operator and/or automatically initiate, with prior authorization of the machine operator, shipment of a replacement rotary union. In addition, the determination at 418 may automatically prompt or initiate creation and transmission of an alert to a subscriber, informing the subscriber of the operating state of the union.

Figure 9:
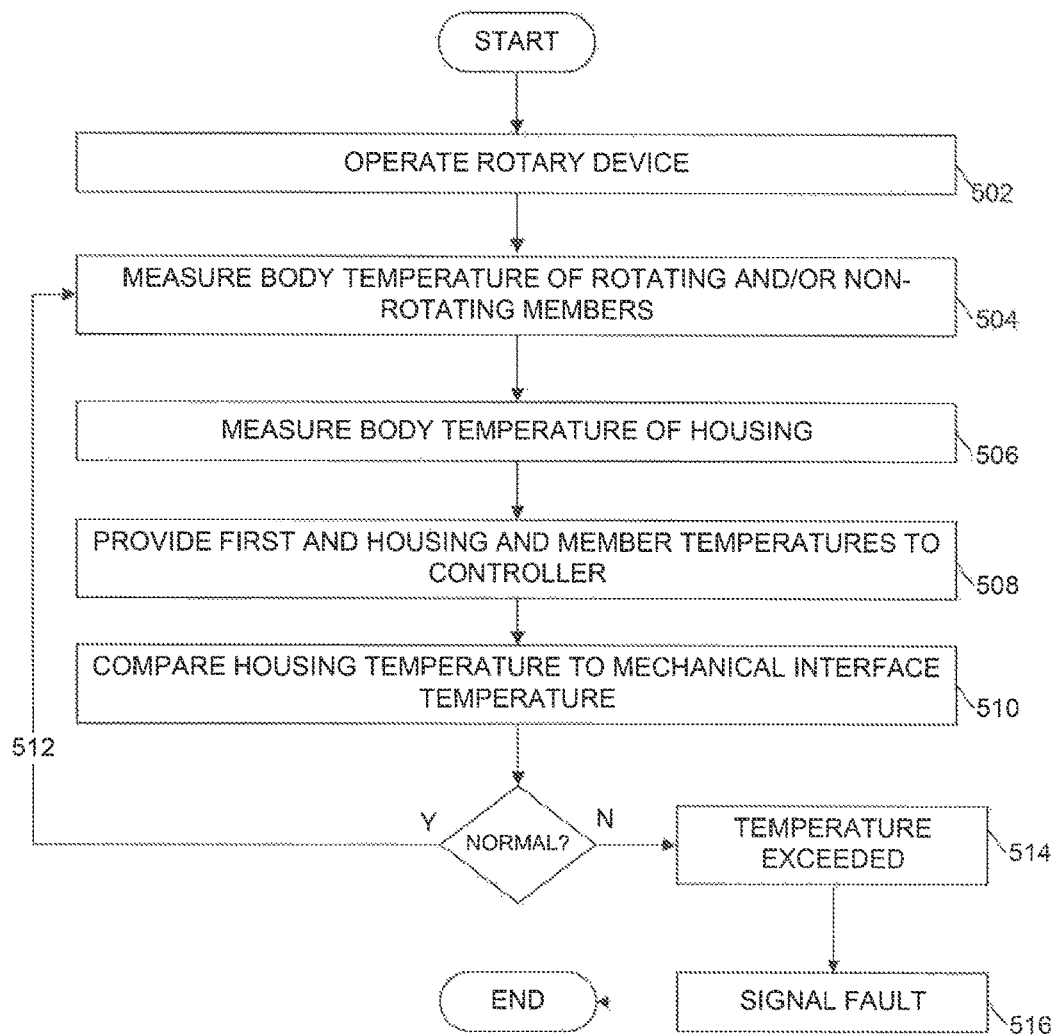

A flowchart for a method of detecting a seal failure in a rotary device is shown in FIG. 9. The method includes operating the device at 502, which includes operating at least two temperature sensors and a controller. The first temperature sensor is configured to measure a temperature associated with a mechanical interface between the rotating and the non-rotating members, for example, by measuring the body temperature of the rotating and/or non-rotating members at 504. The members may be seal rings or may alternatively be electrical connection rings when the rotary device is embodied as a slip ring. In one embodiment, the temperature at 504 is acquired using an IR sensor. The second temperature sensor is configured to measure a temperature associated with the housing of the rotary device, for example, a bulk housing material temperature at 506. The controller receives the first and second temperature readings at 508, and compares the body temperature to the mechanical interface temperature at 510. When the first and second temperatures are within a predetermined range of one another at 512, the monitoring continues. When the first temperature exceeds the second temperature by a predetermined amount at 514, the controller may signal a fault at 516.

Figure 10:
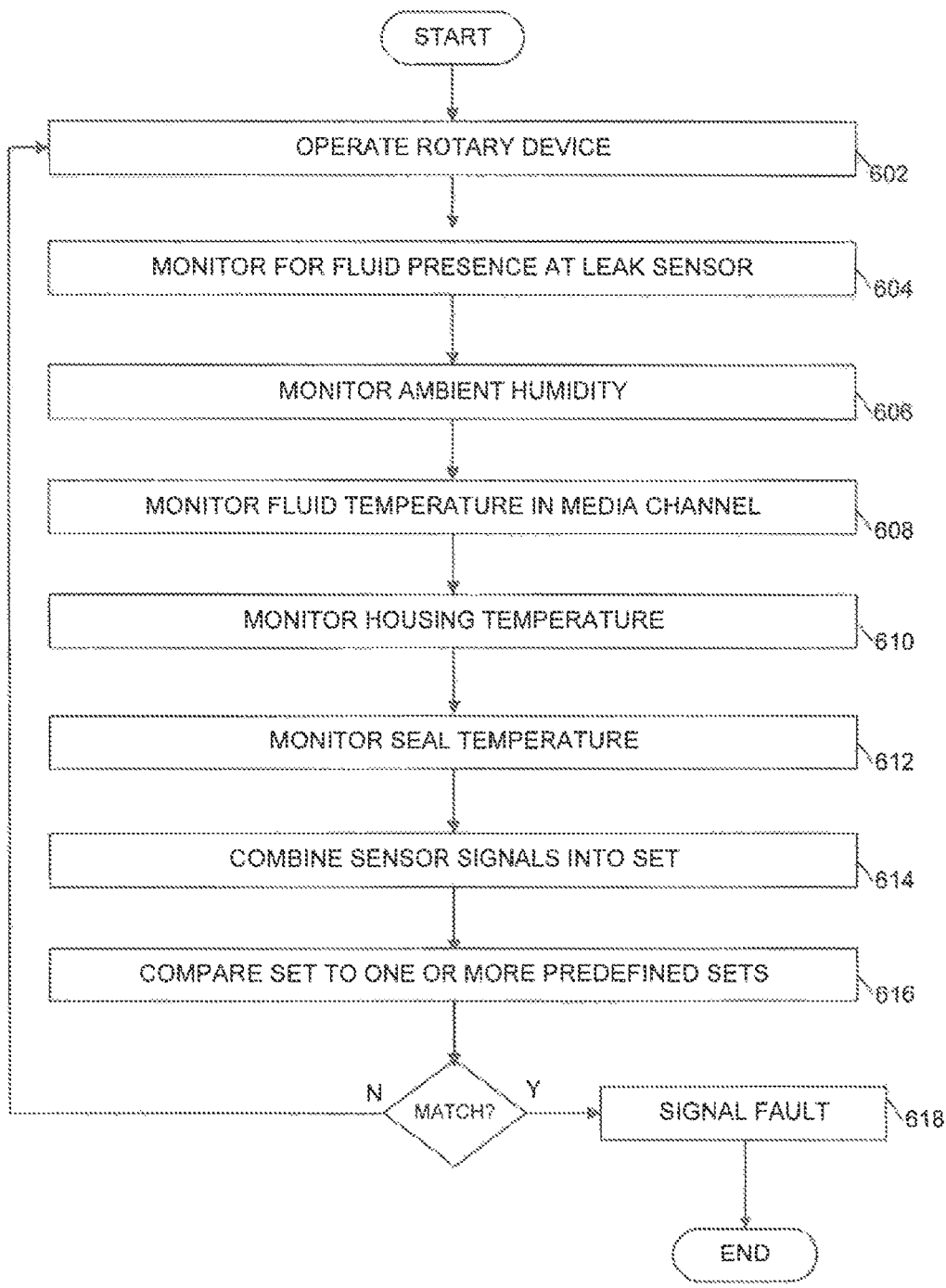
Figure 11:
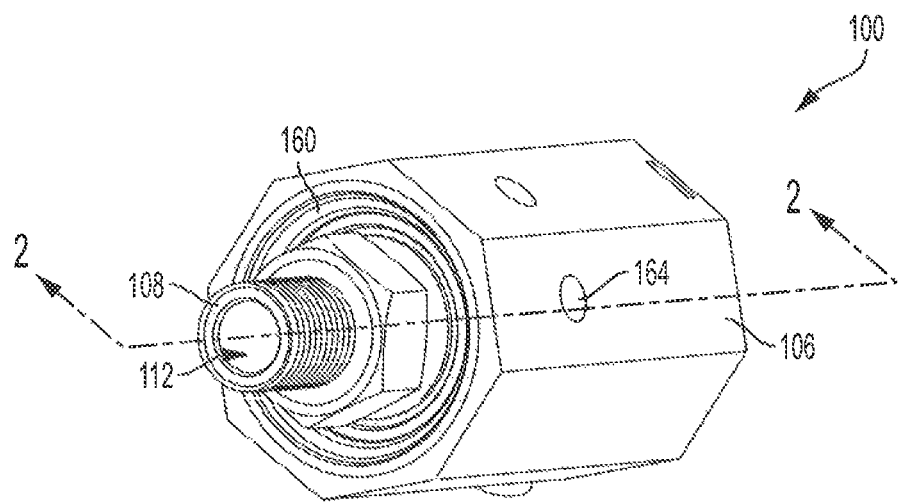
FIGS. 11 and 12 are perspective views of a rotary union in accordance with the disclosure.
Figure 12:
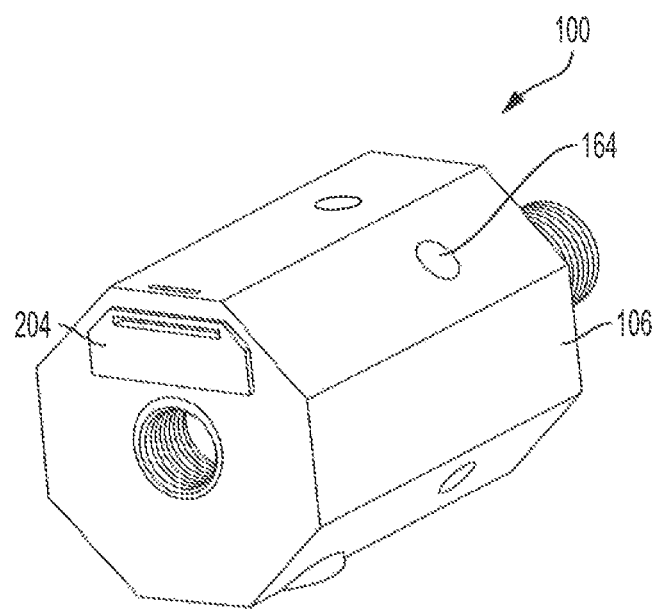

A flowchart for a method of detecting a leak, which avoids false positive leak indications, is shown in FIG. 10. The method includes operating the rotary device at 602, which includes operating a leak sensor, a humidity sensor, a fluid temperature sensor, a housing temperature sensor and, optionally, a motion sensor and also an IR temperature sensor. The leak sensor monitors for presence of fluid at a drain passage at 604, the humidity sensor monitors ambient humidity at 606, the fluid temperature monitors fluid media temperature 608 that is present in the media channel, the housing temperature sensor measures the temperature of the housing at 610, and the IR temperature sensor measures a temperature at the interface between the rotating and non-rotating seal members at 612. The motion sensor may optionally measure vibration of the rotary union. All signals are provided to the controller, which combines the various sensor signals into a set at 614, and compares the set to one or more predefined sets of conditions present in memory at 616. When the set matches a leak condition set present in memory, the controller signals a fault at 618, or otherwise continues monitoring the various parameters as previously described.

The sets present in memory also include sets determined to be false positives, even if the leak sensor provides a leak indication, due to operating effects. For example, in high ambient humidity of a union operating with a cold fluid, which also cools the housing, condensation may form around the leak sensor without an actual leak being present. The predefined sets stored in memory may, for instance, indicate whether the temperature of the union during operation is below a dew point for the given ambient humidity, in which case, without a further indication of failure, it may be presumed that liquid water is condensing on the union rather than leaking from within the union. Accordingly, a leak signal may be provided under condensation circumstances only if another failure indication is also present, for instance, an overheating seal interface, excessive vibration of the union, and the like.

All references, including publications, patent applications, technical documentation and user manuals, patents, and other material cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:
1. A rotary union, comprising:
a housing having a fluid inlet;
a rotating machine component rotatably supported in the housing;
a rotating seal member associated with the rotating machine component;
a non-rotating seal member slidably and sealably disposed within the housing adjacent the rotating seal member;
an expandable seal disposed between and sealably engaging a bore in each of the non-rotating seal member and the housing, the expandable seal including two end portions, one of the two end portions engaged to the non-rotating seal member and the other of the two end portions engaged to the housing;

an internal clamp disposed within an end portion of the expandable seal such that the end portion of the expandable seal is compressed between the internal clamp and the bore of the housing; and a second internal clamp disposed within an end portion of the expandable seal such that the end portion of the expandable seal is compressed between the second internal camp and the bore of the non-rotating seal member.

2. The rotary union of claim 1, wherein the internal clamp is configured to compress the end portion under all operating conditions of the rotary union.

3. The rotary union of claim 1, wherein the internal clamp is configured to compress the end portion at a variable degree depending on a fluid pressure of media within the rotary union.

4. The rotary union of claim 1, wherein the internal clamp includes at least one arcuate wall segment and at least one resilient structure disposed between two adjacent ends of the at least one arcuate wall segment.

5. A rotary union, comprising:
a housing having a fluid inlet;
a rotating machine component rotatably supported in the housing;
a rotating seal member associated with the rotating machine component;
a non-rotating seal member slidably and sealably disposed within the housing adjacent the rotating seal member;
an expandable seal disposed between and sealably engaging a bore in each of the non-rotating seal member and the housing, the expandable seal including two end portions, one of the two end portions engaged to the non-rotating seal member and the other of the two end portions engaged to the housing; and
an internal clamp disposed within an end portion of the expandable seal such that the end portion of the expandable seal is compressed between the internal clamp and the bore of the housing;
wherein the internal clamp includes a plurality of arcuate wall segments and a plurality of resilient structures disposed, one each, between adjacent ends of two adjacent arcuate wall segments around an entire periphery of the internal clamp; and
wherein each resilient structure includes:
two leaf spring portions disposed, one each, at either axial end of the internal clamp; and
a synchronizer bar connected between the two leaf springs.

6. The rotary union of claim 5, wherein each leaf spring portion includes two legs connected to one another at one end to an apex, and connected at each respective second end to an adjacent arcuate wall segment edge, and wherein the synchronizer bar is connected between two apices.

7. The rotary union of claim 6, wherein the legs are disposed in a V-configuration that defines therewithin an angle, the angle being configured to increase as the internal clamp expands to increase its outer diameter.

8. The rotary union of claim 5, wherein the internal clamp is configured to assume an over-center locked position when displaced axially.

9. A rotary union, comprising:
a housing having a fluid inlet;
a rotating machine component rotatably supported in the housing;
a rotating seal member associated with the rotating machine component;
a non-rotating seal member slidably and sealably disposed within the housing adjacent the rotating seal member;
an expandable seal disposed between and sealably engaging a bore in each of the non-rotating seal member and the housing, the expandable seal including two end portions, one of the two end portions engaged to the non-rotating seal member and the other of the two end portions engaged to the housing;
an expandable ring disposed within an end portion of the expandable seal such that the end portion of the expandable seal is compressed between the expandable ring and the bore of the housing;
a second expandable ring disposed within an end portion of the expandable seal such that the end portion of the expandable seal is compressed between the second expandable ring and the bore of the non-rotating seal member.

10. The rotary union of claim 9, wherein each of the expandable ring and the second expandable ring is configured to compress the end portion under all operating conditions of the rotary union.

11. The rotary union of claim 9, wherein each of the expandable ring and the second expandable ring is configured to compress the end portion at a variable degree depending on a fluid pressure of media within the rotary union.

12. The rotary union of claim 9, wherein the expandable ring includes three arcuate wall segments and three resilient structures disposed symmetrically around a periphery of the expandable ring in alternating order.

13. The rotary union of claim 12, wherein each resilient structure includes:
two leaf spring portions disposed, one each, at either axial end of the internal clamp; and
a synchronizer bar connected between the two leaf springs.

14. The rotary union of claim 13, wherein each leaf spring portion includes two legs connected to one another at one end to an apex, and connected at each respective second end to an adjacent arcuate wall segment edge, and wherein the synchronizer bar is connected between two apices.

15. The rotary union of claim 14, wherein the legs are disposed in a V-configuration that defines therewithin an angle, the angle being configured to increase as the internal clamp expands to increase its outer diameter.

16. The rotary union of claim 9, wherein the expandable ring is configured to assume an over-center locked position when displaced axially.

* * * * *